(12) United States Patent
Broutin et al.

(10) Patent No.: US 6,198,757 B1
(45) Date of Patent: Mar. 6, 2001

(54) CONTROL SYSTEM FOR WAVELENGTH STABILIZATION OF A LASER SOURCE

(75) Inventors: Scott L. Broutin, Kutztown; James Kevin Plourde, Allentown; John William Stayt, Jr., Schnecksville, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/140,050

(22) Filed: Aug. 26, 1998

(51) Int. Cl.[7] ........................................ H01S 3/13
(52) U.S. Cl. ............................ 372/32; 372/38; 372/34; 372/26; 372/29
(58) Field of Search ........................ 372/32, 28, 26, 372/29, 38, 98, 34

(56) References Cited

U.S. PATENT DOCUMENTS

| | | | |
|---|---|---|---|
| 5,825,792 | * | 10/1998 | Viloleneuve et al. ............... 372/38 |
| 6,101,200 | * | 8/2000 | Burbidge et al. ..................... 372/32 |
| 6,104,516 | * | 8/2000 | Majima ................................ 372/32 |
| 6,122,087 | * | 9/2000 | Nogiwa et al. ..................... 372/32 |

* cited by examiner

Primary Examiner—Leon Scott, Jr.
(74) Attorney, Agent, or Firm—Stroock & Stroock & Lavan LLP

(57) ABSTRACT

A control system for stabilizing the frequency of optical light output from a laser source including an oscillator for producing a modulation signal and a detection signal. An optical modulator receives the optical light output from the laser source and also receives the modulation signal and outputs a first and second modulator output signal. At least one filter is included for receiving the first modulator output signal and outputting a filtered signal having an amplitude that is a function of the change in frequency of the output light output from the laser source. A first optical detector receives the filtered signal and outputs a first electrical signal. A second optical detector receives the second modulator output signal and outputs a second electrical signal. A wavelength control circuit receives the first and the second electrical signals and the detection signal and outputs a control signal received by the laser source for adjusting the frequency of the optical light.

29 Claims, 4 Drawing Sheets

CONTROL SYSTEM FOR WAVELENGTH STABILIZATION OF A LASER SOURCE

FIELD OF THE INVENTION

The present invention relates generally to optical communication systems and, in particular, to a control system for stabilizing the wavelength of a laser source used in optical communication systems.

BACKGROUND OF THE INVENTION

To meet today's demand for high-speed cost-effective communications, optical transmission systems having increased data capacity are highly desirable. One approach used in modern high-capacity transmission systems to increase the aggregate data-rate of transmission is to use a technique called dense wavelength division multiplexing (DWDM). In DWDM, an optical transmission link is divided into a plurality of channels with each channel having its own center frequency. Data transmitted on a particular channel is then effected by modulating the optical carrier at the center frequency of that channel. At the receiver, a band-pass filter tuned to the center frequency of the channel is used for detecting and demodulating the transmitted signal. By combining a plurality of channels in this manner, the aggregate data capacity of the optical link is increased.

In DWDM transmissions systems, a separation between adjacent channels sufficient to reduce cross-channel interference to acceptable levels is required. Channel separations in the range of 100 GHz are commonly used to achieve sufficient separation. The data capacity of DWDM systems can be further increased by reducing channel separation to e.g. 50 or 25 GHz. The level to which channel separation can be reduced while still maintaining acceptable system performance is dependent in part on the stability of the laser source that generates the optical carrier. For example, if the optical carrier frequency drifts excessively as a result of temperature changes or aging of the laser source, cross-channel interference will increase especially if a smaller channel separation is used. To reduce the occurrence of cross-channel interference caused by frequency drifts, a control system for stabilizing the frequency/wavelength of the optical carrier generated by the laser crystal may be used.

Prior art systems exist in which a feedback loop is employed for stabilizing the output of a laser source. In these prior art systems, the optical beam generated by the laser crystal is passed through a filter and received by a detector which converts the filtered optical signal to a DC electrical signal whose amplitude is a function of the wavelength of the optical beam. The electrical signal is then processed and fed back to the laser source in a manner that controls the laser source to produce an optical beam having the desired wavelength. The laser source can be controlled using any number of the operating parameters of the laser source including temperature, voltage and current. In this way, a control system is provided to stabilize the output frequency of a laser source that may otherwise drift because of aging of the laser source and/or temperature changes.

A drawback of the prior control systems is that the signals used to provide feedback control are DC signals or, at the most, very slowly changing. As a result, DC amplifiers are required to process the control signals which may introduce errors caused by noise, drift, leakage currents and offset voltages that are typically associated with processing DC signals. These errors may interfere with system's ability to stabilize the output of the laser source. Therefore, it is desirable to provide a control system for stabilizing the frequency output of a laser source which reduces the errors associated with processing DC signals.

SUMMARY OF THE INVENTION

The present invention is directed at overcoming the shortcomings of the prior art. The present invention is directed to a control system for adjusting the frequency of optical light output from a laser source thereby stabilizing the wavelength of the laser source. The control system includes an oscillator for producing a modulation signal and a detection signal. An optical modulator receives the optical light output from the laser source and also receives the modulation signal and outputs a first and second modulator output signal. At least one filter is included for receiving the first modulator output signal and outputting a filtered signal having an amplitude that is a function of the change in frequency of the output light output from the laser source. A first optical detector receives the filtered signal and outputs a first electrical signal. A second optical detector receives the second modulator output signal and outputs a second electrical signal. A wavelength control circuit receives the first and the second electrical signals and the detection signal and outputs a control signal received by the laser source for adjusting the frequency of the optical light. Thus, if the frequency of the optical light drifts because of aging of the laser source or a temperature change, the control system of the present invention will adjust the frequency of the optical light thereby stabilizing the wavelength of the laser source.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein line reference numerals depict line elements throughout the several views.

DETAILED DESCRIPTION OF THE PREFERRED EMBODIMENTS

Figure 1:
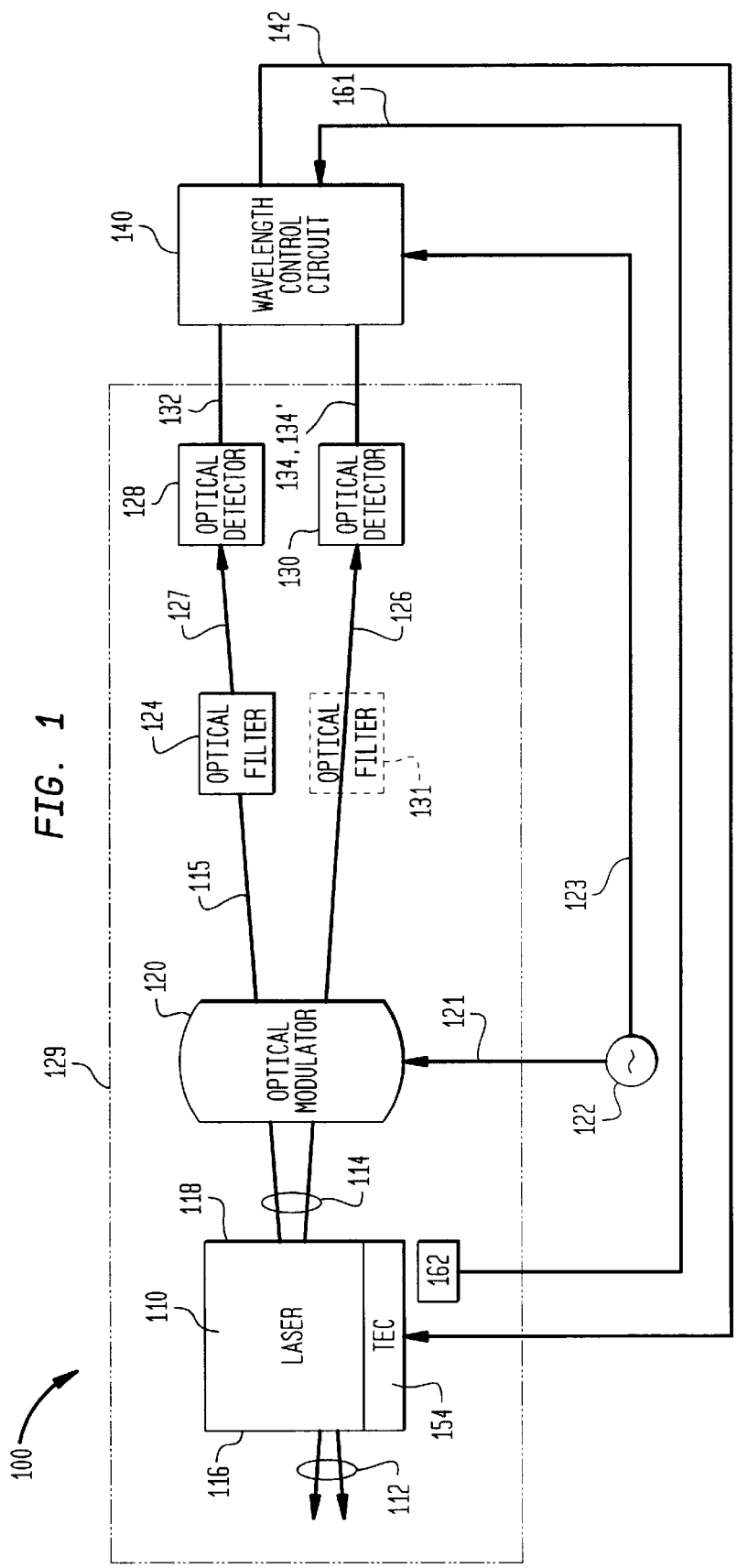
FIG. 1 is a schematic diagram of a wavelength control system constructed in accordance with a first embodiment of the present invention.

Referring now to FIG. 1, there is shown a wavelength control system 100 constructed in accordance with a first embodiment of the present invention. Wavelength control system 100 includes a laser source 110, such as a laser crystal. An optical light 112 is output from a front face 116 of laser crystal 110 and is used as the optical carrier positioned at the center frequency of a channel in a DWDM transmission system. An optical light 114 is output from a back face 118 of laser crystal 110. Because the frequency of optical light 112. 114 output from laser crystal 110 is temperature dependent, a thermoelectric cooler (TEC) 154 is placed in proximity to laser crystal 110 to regulate the temperature of laser crystal 110. A temperature sensor 162 is placed in proximity of laser crystal 110 to measure the operating temperature of laser crystal 110 and outputs a sensor output 161. Temperature sensor 162 may be any device used to measure temperature, including but not limited to a thermistor.

An oscillator 122 generates a modulating signal 121 and a detection signal 123 which preferably have a frequency in the range of 30–100 Hz and more preferably in the range of 30–50 Hz and even more preferably a frequency of 40 Hz. Signals 121, 123 may be of any type including sinusoidal or square wave.

An optical modulator 120 receives optical light 114 from laser crystal 110 and modulating signal 121 from oscillator 122. Optical modulator 120 produces a pair of modulated light beams 115, 126 that is generated by modulating optical light 114 with modulating signal 121.

An optical filter 124 receives modulated light beam 115 and produces a filtered output 127. Optical filter 124 may have any frequency response including, but not limited to, a band-pass, band-stop, high-pass or low-pass frequency response. Optical filter 124 is tuned so that the frequency of optical light 114 falls within the rolloff portion of the frequency response of optical filter 124. In this way, any variation in the frequency of optical light 114 will result in a change in the amplitude of filtered output 127.

For example, if the frequency of optical light 114 is $1.9 \times 10^{14}$ Hz and optical filter 124 has a rolloff region with an amplitude ranging from zero attenuation to 50% attenuation over a frequency range of 25 GHz, the frequency of $1.9 \times 10^{14}$ Hz is positioned in the middle of this 25 GHz range. If the frequency of optical light 114 drifts, for example, due to aging or temperature variations of laser crystal 110, modulated optical light 115 shifts within the 25 GHz range of the rolloff region of optical filter 124 which results in a proportional change in amplitude in filtered output 127 that is a function of the frequency change of optical light 114. Because optical light 114 is modulated by modulating signal 121, the amplitude change in filtered output 127 is modulated with a frequency equal to that of modulating signal 121.

An optical detector 128 receives filtered output 127 and converts filtered output 127 from optical energy to a filtered electrical signal 132 having a frequency equal to that of modulating signal 121 and an amplitude that is a function of the change in either frequency or power (amplitude) of optical light 114.

An optical detector 130 receives modulated light beam 126 and outputs an unfiltered electrical signal 134. Because modulated light beam 126 is not processed by an optical filter, as is modulated light beam 115, unfiltered electrical signal 134 has a frequency equal to that of modulating signal 121 and an amplitude that varies as a function of a change in the power (amplitude) of optical light 114.

Figure 4:
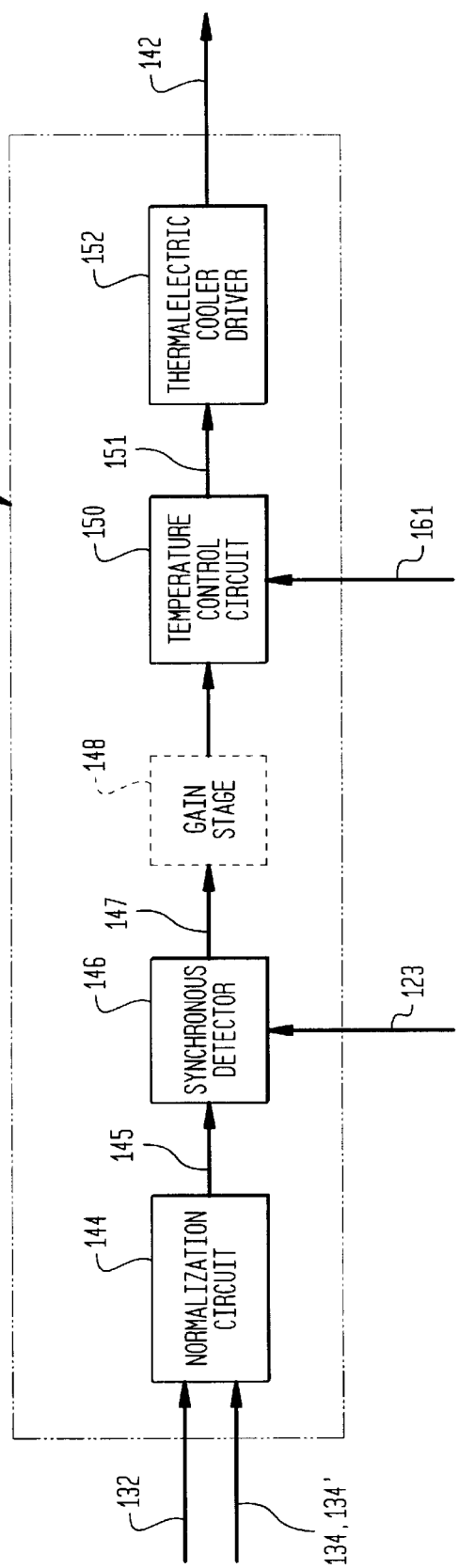
FIG. 4 is a schematic diagram of a wavelength control circuit constructed in accordance with the present invention.

A wavelength control circuit 140 receives filtered electrical signal 132 and unfiltered electrical signal 134. Referring now to FIG. 4, there is shown a schematic diagram of wavelength control circuit 140. Wavelength control circuit 140 includes a normalization circuit 144 which divides the amplitude of filtered electrical signal 132 by the amplitude of unfiltered electrical signal 134 and produces a normalized signal 145 that has a frequency equal to that of modulating signal 121 and an amplitude that is solely a function of a change in frequency of optical light 114. Thus, unfiltered electrical signal 134 is used as a reference signal to account for any changes in amplitude that result from changes in power of optical light 114.

A synchronous detector 146 receives normalized signal 145 and modulating signal 123 and performs synchronous detection of the amplitude changes in normalized signal 145 which is a function of the frequency changes of optical light 114. Synchronous detection, a technique known in the art, produces an output that has two components: a first component that is a function of the sum of the frequencies of normalized signal 145 and modulating signal 123 and a second component that is a function of the difference between the frequencies of normalized signal 145 and modulating signal 123. Because the frequency of normalizing signal 145 is equal to the frequency of modulating signal 123, the second component is a DC signal 147 having an amplitude that is a function of a change in frequency of optical light 114. DC signal 147 may then be passed through a gain stage 148 to increase its power level, if necessary.

In an exemplary embodiment, wavelength control circuit 140 includes a temperature control circuit 150 that receives DC signal 147 (or the output of gain stage 148, if used). Temperature control circuit 150 converts the amplitude of DC signal 147, which is a function of the change in frequency of optical light 114, to a temperature change signal 151 which corresponds to a temperature change that, when applied to laser crystal 110, will cause a shift in the frequency of optical light 112, 114 to compensate for the frequency drift laser crystal 110. Temperature control circuit 150 can include circuitry to perform amplitude-to-temperature change conversion in any manner known in the art including, but not limited to, a potentiometer or digital circuitry. Temperature control circuit 150 receives sensor output 161 which indicates the current operating temperature of laser crystal 110. In an exemplary embodiment, the relationship between amplitude and temperature is factory set and is calibrated to the particular laser crystal 110 and optical filter 124 used.

A thermal electric cooler driver 152 receives temperature change signal 151 and outputs a temperature control signal 142. Thermal electric cooler 154 receives temperature control signal 142 and adjusts the temperature of laser crystal 110 in accordance with temperature control signal 142. Temperature control circuit 150, and thermal electric cooler driver 152 can also be located in the laser module.

The operation of wavelength control system 100 will now be described. Optical light 114, output from back face 118 of laser crystal 110, is modulated by modulating signal 121 generated by oscillator 122. Optical filter 124 receives modulated light beam 115 and produces filtered output 127 which is an amplitude modulated signal having an amplitude that is a function of the change in frequency of optical light 114. Optical detectors 128, 130 receive filtered output 127 and modulated light beam 126, respectively, and output filtered electrical signal 132 and unfiltered electrical signal 134, respectively. Wavelength control circuit 140 receives filtered electrical signal 132, unfiltered electrical signal 134 and sensor output 161. If optical light 114 is at the desired frequency, the temperature of laser crystal 110 is left unchanged. On the other hand, if the frequency of optical light 114 drifts due to, for example, aging of laser crystal 110 or temperature changes, then wavelength control circuit 140 outputs temperature control signal 142 signaling thermal electric cooler 154 to adjust the temperature of laser crystal 110 to compensate for the frequency drift.

Thus, in accordance with the present invention, wavelength control system 100 is provided which stabilizes the wavelength (frequency) of laser crystal 110. Also, because the measurement of any change in frequency in laser crystal 110 is modulate d by modulating signal 121, the errors introduced into wavelength control system 100 as a result of processing DC signals is minimized.

In an exemplary embodiment, optical modulator 120, optical filter 124 and optical detectors 128, 130 and wavelength control circuit 140 may be integrated into the laser package. In such an embodiment, an electroabsorption (EML) type modulator is desirable, although other types of optical modulators may be used instead.

Alternatively, wavelength control circuit 140 may not be integrated into the laser package so that only optical modulator 120, optical filter 124 and optical detectors 128, 130 are integrated into the laser package (see element 129 in FIG. 1). Wavelength control circuit 140 may be kept separate from the laser package due to space and thermal dissipation restraints of the laser package. Also, because DC signals are processed within wavelength control circuit 140, it may be advantageous to isolate wavelength control circuit 140 from the laser package to reduce interference with the DC signal processing performed in wavelength control circuit 140.

In an exemplary embodiment, a second optical filter 131 having a different slope than that of optical filter 124 is included. In this case, optical detector 130 receives the output of second optical filter 131 and outputs a second filtered electrical signal 134'. When filtered electrical signal 132 is divided by second filtered electrical signal 134' in normalization circuit 144, the changes in amplitude that result from changes in power of optical light 114 is eliminated and an amplitude that is proportional to the ratio of slopes of optical filters 124, 131 is used as a measure of the frequency change of optical light 114.

Although in the above description the frequency of laser crystal 110 is stabilized by adjusting the operating temperature of laser crystal 110, any other adjustable parameters of laser crystal 110 which affects the frequency of optical light 114 may be selected to control the frequency output of laser crystal 110. If such other parameters are used, for example voltage or current, wavelength control circuit 140 will include appropriate circuitry to convert the amplitude of DC signal 147 to a signal for adjusting the selected operating condition of laser crystal 110 to compensate for any frequency drift.

Figure 2:
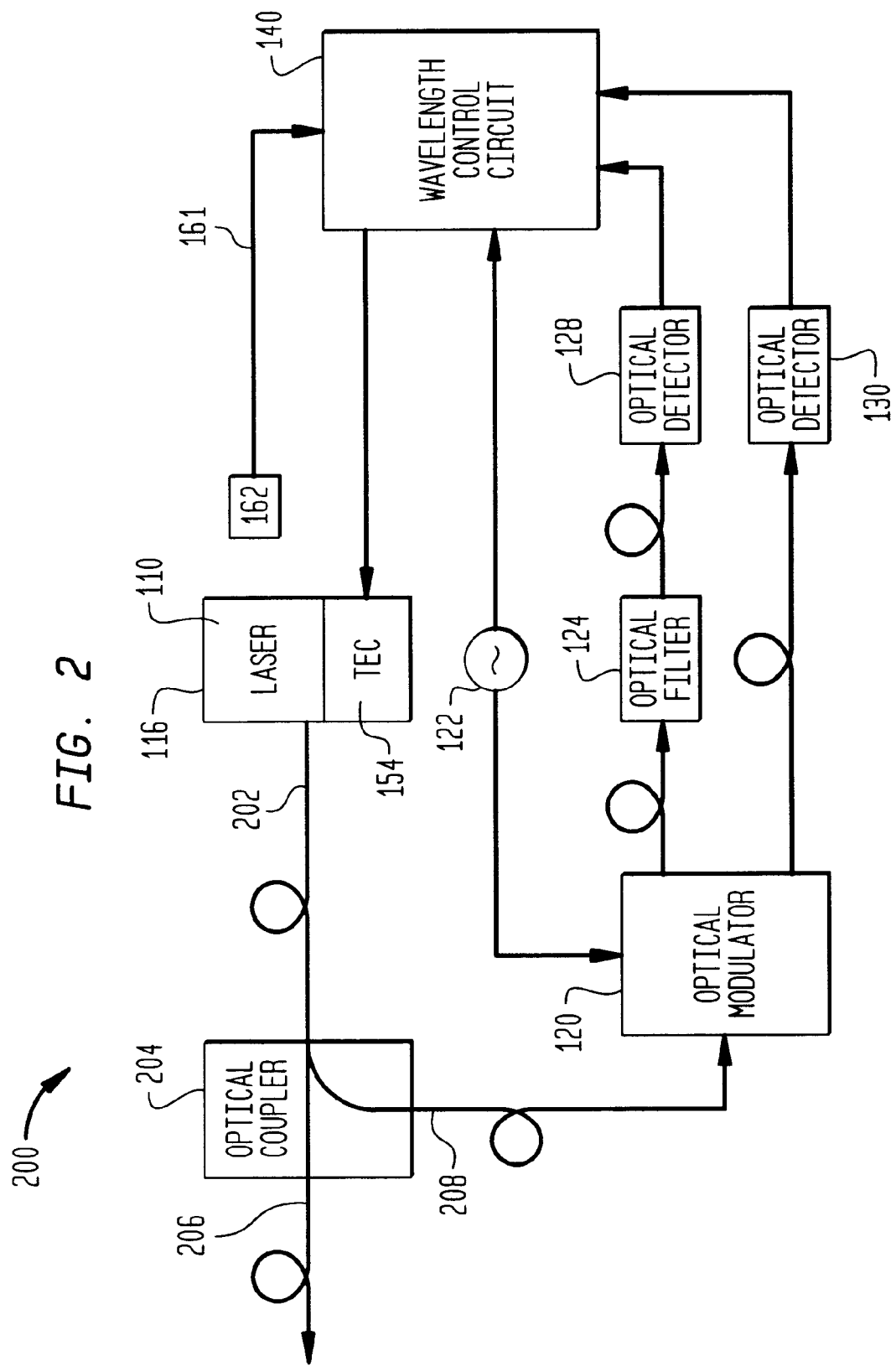
FIG. 2 is a schematic diagram of a wavelength control system constructed in accordance with a second embodiment of the present invention.

Referring now to FIG. 2, there is shown a wavelength control system 200 constructed in accordance with a second embodiment of the present invention. Elements that are the same as those in wavelength control system 100 depicted in FIG. 1 are identically labeled and a detailed description thereof is omitted.

In wavelength control system 200, laser crystal 110 outputs from front face 116 an optical light 202. An optical coupler 204 receives optical light 202 and splits optical light 202 into two parts: a laser output 206 that is used as the optical carrier positioned at the center frequency of a channel in a DWDM transmission system, and a coupler output 208 that is received by optical modulator 120. The rest of wavelength control system 200 operates in the same manner as wavelength control system 100. Thus, in the second embodiment, an optical light taken from front face 116 of laser crystal 110 is sampled and used by wavelength control system 200 to stabilize the wavelength (frequency) of optical light 202.

Figure 3:
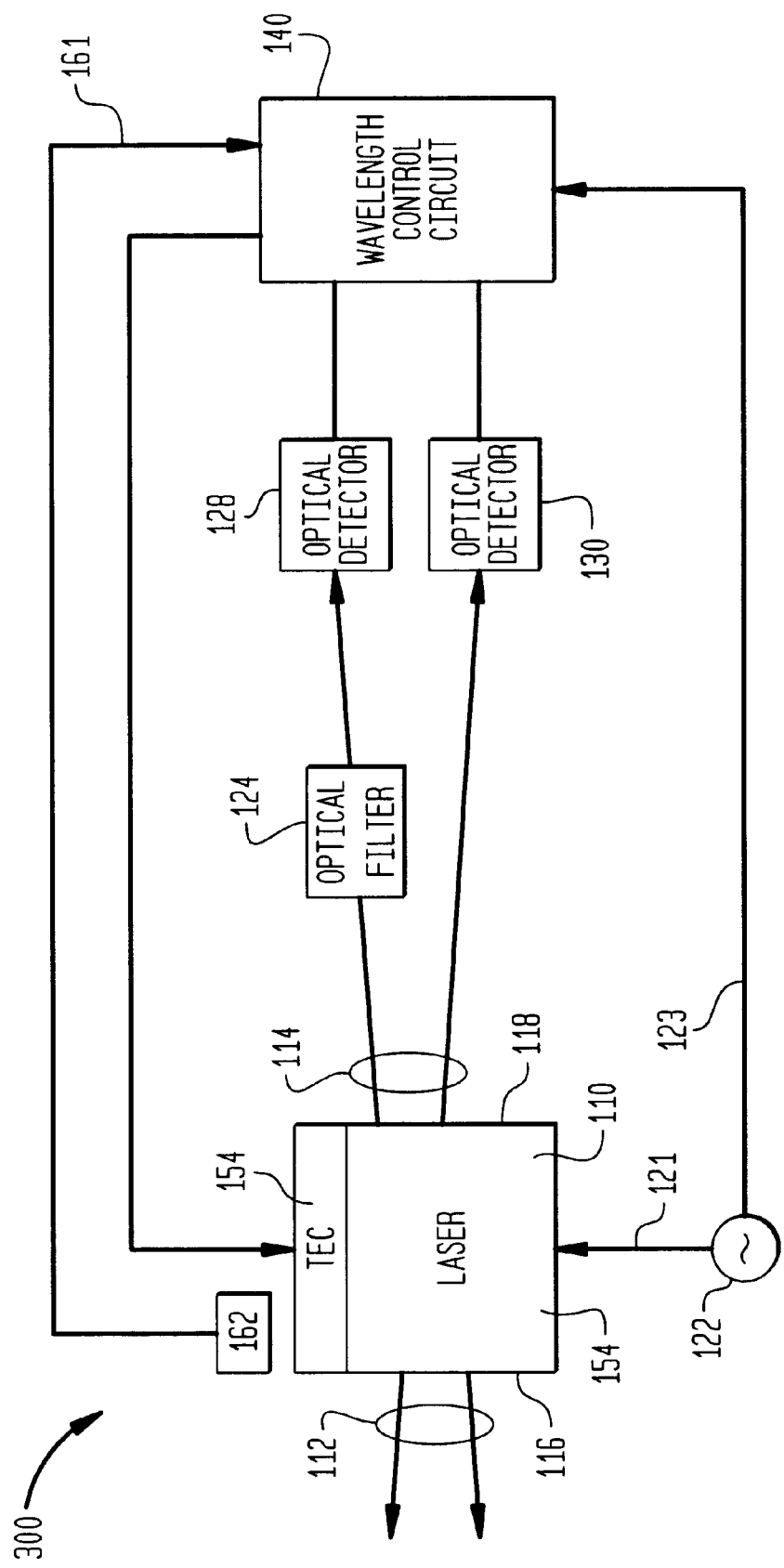
FIG. 3 is a schematic diagram of a wavelength control system constructed in accordance with a third embodiment of the present invention.

Referring now to FIG. 3, there is shown a wavelength control system 300 constructed in accordance with a third embodiment of the present invention. Elements that are the same as those in previous embodiments are identically labeled and a detailed description thereof is omitted.

Wavelength control system 300 does not include optical modulator 120 as in the previous embodiments. Instead, modulation signal 121 the modulated output from oscillator 122 is applied directly to laser crystal 110. As a result, optical light 112 output from front face 116 and optical light 114 output from back face 118 is modulated by modulation signal 121 and this modulated optical light 114 is then processed by optical filter 124 and optical detectors 128, 130 in a similar manner as the previous embodiment. By eliminating optical modulator 120, the complexity of wavelength control system 300 is reduced. Also, even though output light 112 is also modulated by modulating signal 121, this has no adverse practical consequence because the frequency of modulating light 121, which is preferably in the range of 30–100 Hz, is many orders of magnitude lower than the frequency of optical light 112 and will not affect the operation of a DWDM transmission system.

Although a wavelength control system used as part of a DWDM transmission system is described above, it will be obvious to one with ordinary skill in the art to apply these techniques to control the output frequency of any signal source in a manner which minimizes errors associated with processing DC signals.

Thus, which there have been shown and described and pointed out fundamental novel features as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A control system for adjusting the frequency of optical light output from a laser source, comprising:

an oscillator, said oscillator producing a modulation signal and a detection signal;

an optical modulator, said optical modulator receiving at least a portion of said optical light output from said laser source and said modulation signal and outputting a first and second modulated output signal;

at least one filter, said at least one filter receiving said first modulated output signal and outputting a filtered signal having an amplitude that is a function of a change in frequency of said optical light output from said laser source;

a first and second optical detector, said first optical detector receiving said filtered signal and outputting a first electrical signal, said second optical detector receiving said second modulated output signal and outputting a second electrical signal; and a wavelength control circuit, said wavelength control circuit receiving said first and said second electrical signals and said detection signal and outputting a control signal to said laser source for adjusting the frequency of said optical light.

2. The control system of claim 1, wherein said laser source has a back face and said optical light is output from said back face.

3. The control system of claim 1, wherein said modulation signal and said detection signal have the same frequency.

4. The control system of claim 3, wherein said frequency of said modulation signal and said detection signal is in the range of 30–100 Hz.

5. The control system of claim 3, wherein said frequency of said modulation signal and said detection signal is in the range of 30–50 Hz.

6. The control system of claim 3, wherein said frequency of said modulation signal and said detection signal is 40 Hz.

7. The control system of claim 1, wherein said at least one filter has a rolloff region over a frequency range defining a slope and said frequency of said optical light is within said frequency range.

8. The control system of claim 1, wherein said at least one filter is a band pass filter.

9. The control system of claim 1, wherein said at least one filter is a band stop filter.

10. The control system of claim 1, wherein said at least one filter is a high pass filter.

11. The control system of claim 1, wherein said at least one filter is a low pass filter.

12. The control system of claim 1, further comprising a second optical filter having a rolloff region over a frequency range defining a slope that is different than said slope of said at least one filter, said second filter receiving said second modulated output signal and outputting said second modulated signal to said second optical detector.

13. The control system of claim 1, wherein said first and said second optical detectors are photo detectors that convert optical light to electric current.

14. The control system of claim 1, wherein said wavelength control circuit includes a normalization circuit, said normalization circuit outputting a normalized signal having a frequency equal to that of said modulating signal and an amplitude that is a function of a change in frequency of said optical light.

15. The control system of claim 14, wherein said wavelength control system includes a synchronous detector, said synchronous detector receiving said normalized signal and said detection signal and outputting a DC signal having an amplitude that is a function of said change in frequency of said optical light.

16. The control system of claim 15, wherein said DC signal has a power level and said wavelength control circuit includes a gain stage for increasing said power level of said DC signal.

17. The control system of claim 15, wherein said wavelength control circuit includes a temperature control circuit, said temperature control circuit receiving said DC signal and outputting a control signal to said laser source for controlling the operating temperature of said laser source thereby adjusting the frequency of said optical light output from said laser source.

18. The control system of claim 17, wherein said optical device includes a thermal electric cooler for adjusting the operating temperature of said optical device, said thermal electric cooler receiving said control signal.

19. The control system of claim 17, wherein said temperature control circuit is a potentiometer.

20. The control system of claim 17, wherein said temperature control circuit is a digital circuit.

21. The control system of claim 17, wherein said control signal controls the current applied to said optical device.

22. The control system of claim 17, wherein said control signal controls the voltage applied to said optical device.

23. The control system of claim 1, wherein said optical modulator, said at least one filter and said first and said second optical detectors are integrated with said laser source.

24. The control system of claim 23, wherein said wavelength control circuit is integrated with said laser source.

25. The control system of claim 1, wherein said laser source has a front face and said optical light is output from said front face, and further comprising an optical coupler, said optical coupler receiving said optical light and outputting said at least a portion of said optical light to said optical modulator.

26. A control system for adjusting the frequency of optical light output from a laser source, comprising:

an oscillator, said oscillator producing a modulation signal and a detection signal, said modulation signal being received by said laser source so that said laser source outputs a first and second modulated output signal;

at least one filter, said at least one filter receiving said first modulated output signal and outputting a filtered signal having an amplitude that is a function of a change in frequency of said optical light output from said laser source;

a first and second optical detector, said first optical detector receiving said filtered signal and outputting a first electrical signal, said second optical detector receiving said second modulated output signal and outputting a second electrical signal; and a wavelength control circuit, said wavelength control circuit receiving said first and said second electrical signals and said detection signal and outputting a control signal to said laser source for adjusting the frequency of said optical light.

27. A control system for adjusting the frequency of a signal output from a signal source, comprising:

an oscillator, said oscillator producing a modulation signal and a detection signal;

a modulator, said modulator receiving at least a portion of said signal output from said signal source and said modulation signal and outputting a first and second modulated output signal;

at least one filter, said at least one filter receiving said first modulated output signal and outputting a filtered signal having an amplitude that is a function of a change in frequency of said signal output from said signal source; and a wavelength control circuit, said wavelength control circuit receiving said filtered signal, said second modulated output signal and said detection signal and outputting a control signal to said signal source for adjusting the frequency of said signal output.

28. A control system for adjusting the frequency of optical light output from a laser source, comprising:

an oscillator means for producing a modulation signal and a detection signal;

an optical modulator means for receiving at least a portion of said optical light output from said laser source and said modulation signal and outputting a first and second modulated output signal;

at least one filter means for receiving said first modulated output signal and outputting a filtered signal having an amplitude that is a function of a change in frequency of said optical light output from said laser source;

a first and second optical detector means, said first optical detector means for receiving said filtered signal and outputting a first electrical signal, said second optical detector means receiving said second modulated output signal and outputting a second electrical signal; and a wavelength control circuit means for receiving said first and said second electrical signals and said detection signal and outputting a control signal to said laser source for adjusting the frequency of said optical light.

29. A method for adjusting the frequency of optical light output from a laser source, comprising the steps of:

producing a modulation signal and a detection signal;

modulating at least a portion of said optical light output from said laser source with said modulation signal and outputting a first and second modulated output signal;

filtering said first modulated output signal and outputting a filtered signal having an amplitude that is a function of a change in frequency of said optical light output from said laser source;

detecting said filtered signal and said second modulated output signal and outputting a first electrical signal and a second electrical signal, respectively; and outputting a control signal, based on said first electrical signal and said second electrical signal, to said laser source for adjusting the frequency of said optical light.

* * * * *